United States Patent
Minami et al.

(10) Patent No.: US 6,825,965 B2
(45) Date of Patent: Nov. 30, 2004

(54) SOLID TYPE ELECTROCHROMIC GLARE-PROOF MIRROR

(75) Inventors: Chihiro Minami, Shizuoka (JP); Takuo Mochizuka, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/432,262

(22) PCT Filed: Oct. 10, 2001

(86) PCT No.: PCT/JP01/08878

§ 371 (c)(1),
(2), (4) Date: Oct. 23, 2003

(87) PCT Pub. No.: WO03/034139

PCT Pub. Date: Apr. 24, 2003

(65) Prior Publication Data

US 2004/0051931 A1 Mar. 18, 2004

(51) Int. Cl.[7] ................................................. G02F 1/15
(52) U.S. Cl. ........................................ 359/265; 359/267
(58) Field of Search ................................ 359/265–275; 345/105

(56) References Cited

U.S. PATENT DOCUMENTS

| 5,448,397 A | | 9/1995 | Tonar |
| 5,777,780 A | * | 7/1998 | Terada et al. ............... 359/273 |
| 2001/0006430 A1 | | 7/2001 | Ikai et al. |

FOREIGN PATENT DOCUMENTS

| EP | 855615 | 7/1998 |
| JP | 55-93128 | 7/1980 |
| JP | 6-222398 | 8/1994 |
| JP | 7-181523 | 7/1995 |
| JP | 07-304969 | 11/1995 |
| JP | 2000-2895 | 1/2000 |
| JP | 2000-328042 | 11/2000 |
| JP | 2001-33830 | 2/2001 |
| JP | 2001-303024 | 10/2001 |

OTHER PUBLICATIONS

Patent Abstracts of Japan, JP 55–093128, Jul. 15, 1980.

* cited by examiner

Primary Examiner—Hung Xuan Dang
Assistant Examiner—Tuyen Tra
(74) Attorney, Agent, or Firm—Oblon, Spivak, McClelland, Maier & Neustadt, P.C.

(57) ABSTRACT

A resin containing a prescribed filler that can minimize a change in moisture content is used in an electrochromic film as a sealing resin, and further the outer circumference is sealed by a silyl-containing polymer. Here, by the use of the epoxy resin containing the prescribed filler, which can minimize a change in moisture content in an electrochromic film, the moisture content in the electrochromic layer can be stabilized to a level near the use of the sealing glass relative to the environmental changes such as a high temperature and a high humidity. Consequently, there is an extremely high possibility to avoid the use of sealing glass in comparison with the use of a conventional resin. However, to secure resistance to an elevated temperature and resistance to a high humidity on a practically satisfied level, the outer circumference is further sealed by a silyl-containing polymer.

13 Claims, 3 Drawing Sheets

SOLID TYPE ELECTROCHROMIC GLARE-PROOF MIRROR

TECHNICAL FIELD

This invention relates to an electrochromic mirror etc., which is used as an antiglare mirror for an automobile interior mirror or exterior mirror, and particularly to a sealing mechanism etc. for a solid type electrochromic antiglare mirror.

BACKGROUND ARTS

FIG. 3 shows a construction of a conventional usual electrochromic mirror. In this figure, numeral 11 is a flat, transparent substrate glass having a transparent conductive film 12, a solid type electrochromic layer 13 and a film 14 serving as an electrode and reflecting film such as an aluminum-made film formed on the back surface thereof on this order. The solid type electrochromic layer 13 has a construction of three-layers, comprising an oxidizing chromic film 13a, such as iridium oxide ($IrO_x$), a solid electrolyte film 13b, such as tantalum pentoxide ($Ta_2O_5$), and a reductive chromic film 13c, such as tungsten trioxide ($WO_3$). By the application of voltage between the transparent conductive film 12a and film 14 serving as an electrode and reflecting film (transparent conductive film 12b), the oxidizing chromic film 13a and the reductive chromic film 13c are simultaneously colored due to the reduction oxidation reaction, which decreases an incident light to and the reflected light on the film 14 serving as an electrode and reflecting film, thereby lowering the reflectance of the mirror and gaining an antiglare function. Also, by applying a voltage with reverse direction to the above voltage, the oxidizing chromic film 13a and the reductive chromic film 13c are simultaneously discolored due to the reduction oxidation reaction to be in the usual reflection stage with no lowered reflectance.

The solid type electrochromic layer 13 and the film 14 serving as an electrode and reflecting film are totally sealed by sealing resin 15 from their back surface sides including their back and side surfaces, and the back surface of the sealing resin 15 is further adhered to a sealing glass 16. The sealing glass 16 possesses a function to support the electrochromic layer 13 and the film 14 serving as an electrode and reflecting film sealed by the sealing resin 14 from their back surfaces through its mechanical strength, and a protective function to improve water proofing property, resistance to moisture permeability, corrosion resistance, etc. Furthermore, the sealing glass 16 has an ion-interrupting function which interrupts the movement of ions to prevent proton $H^+$ ($H^+$) and $OH^-$ ion existing in constant amounts in the electrochromic layer 13 and bringing out coloration and discoloration from being discharged out (diffusion) and to prevent moisture and ions from entering in the electrochromic layer 13 whereby the coloration and discoloration reactions in the electrochromic layer can take place in a normal manner.

As described above, the electrochromic layer 13 exhibits its chromation reaction due to the moisture (including $H^+$ ion and $OH^-$ ion) existing in its film, high durability against environmental changes such as high temperature and high humidity conditions cannot be obtained on a practical level unless the moisture content in the electrochromic film is stabilized. For this reason, high durability on a practical level is obtained by adhesion of the sealing glass 16.

Now, the electrochromic antiglare mirror having any other construction will be described.

Japanese Patent Laid-Open 2000-2895 concerns a sealing construction of a solid type electrochromic antiglare mirror, and is characterized in that the solid type electrochromic layer 13 and the film 14 serving as an electrode and reflecting film shown in FIG. 3 are covered with, sealed and protected by a resin film (typically modified epoxy resin) having an ion-interrupting function which interrupts the movement of ions, water proofing property, anti-humidity, corrosion resistance and no sealing glass 16 is required.

However, even if the modified epoxy resin is used as the sealing resin, the moisture content in the electrochromic film against the environmental changes such as high temperature and high humidity conditions cannot be stabilized to a level near the case of utilizing the sealing glass, and there is the problem that no durability and no reliability sufficient for responding the environmental changes cannot be obtained. In addition, such a technique requires a step for adhering of a rubber adhesive sheet or a plastic, posing a problem in terms of man-hours.

Japanese Patent Laid-Open 2001-33830, which is directed to construction for sealing an electrochromic mirror, etc., is characterized in that the electrochromic layer 13 and the film 14 serving as an electrode and reflecting film shown in FIG. 3 shown in FIG. 3 are covered with, sealed and protected by a silicone rubber having weatherability, humidity resistance, abrasion resistance, and heat resistance a prescribed member having water proofing property, anti-humidity, abrasion resistance and heat resistance such as a polymer film is provided on the back surface of the silicone rubber wherein a member having silicone rubber is utilized as said silicone rubber and said prescribed member in such a manner that the surface of the silicone rubber of the member having silicone rubber is adhered on the back surface and the side surfaces of the film 14 serving as an electrode and reflecting film so as to envelope the film. The outer circumference surface of the mirror from the substrate glass to the prescribed member is covered with a humidity proofing material.

However, even in the case where the silicone rubber is used as the sealing resin, the polymer film is provided on the back surface of the silicone rubber, and the outer circumference surface of the mirror is covered with the humidity-proofing material, the moisture content in the electrochromic film against the environmental changes such as high temperature and high humidity conditions cannot be stabilized to a level near the case of utilizing the sealing glass, and there is the problem that no durability and no reliability sufficient for responding the environmental changes cannot be obtained. In addition, such a technique requires a step for adhering of a rubber adhesive sheet or a plastic, posing a problem in terms of man-hours. In addition, since the silicone rubber surface of the member having silicone rubber is adhered, the reliability for adhesion is low.

As described above, in order to obtain durability and reliability against the environmental changes such as a high temperature and a high humidity on a practically sufficient level, the sealing glass must be used at the present situation. Furthermore, as shown in FIG. 4, the side portion of the electrochromic mirror should be doubly sealed by a fluorine type coating 5 and an anti-humidity material 6 such as a butyl tape. In FIG. 4, the numeral 1 indicates a substrate glass having a transparent conductive film, 2 is an electrochromic layer and a metal reflector, 3 is a sealing resin, and 4 is a sealing glass.

In addition, Japanese Patent Laid-Open No. 6-222398 relates to an electrochromic mirror, which utilizes a metal plate instead of the sealing glass 4 shown in FIG. 4.

However, there is a problem concerning the requirement of adhering the metal plate similar to the above technique.

U.S. Pat. No. 5,448,397 is directed to an automatic side-view mirror and utilizes a sealing glass 4 as shown in FIG. 5, which remains the problem concerning reducing the weight.

As described above, an electrochromic antiglare mirror having no member corresponding to the sealing glass and having high durability and reliability against environmental changes such as a high temperature and a high humidity has not yet been provided on a practical level.

SUMMARY OF THE INVENTION

In the present invention, for example, as shown in FIG. 1, resin containing prescribed filler which can minimize a change in moisture content in an electrochromic film is used as a sealing resin, and an outer circumference is sealed by a silyl-containing polymer 9 whereby high durability and reliability against environmental changes such as a high temperature and a high humidity can be obtained, and a member corresponding to the sealing glass can be successfully eliminated from an electrochromic antiglare mirror having no member corresponding to the sealing glass for the first time.

BEST MODE FOR CARRYING OUT THE INVENTION

Figure 1:
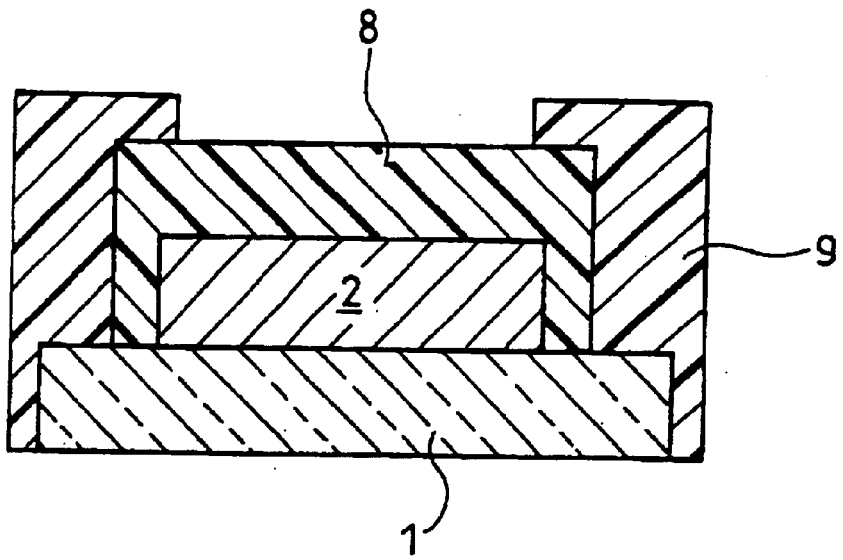
FIG. 1 is a cross sectional view schematically showing the configuration of the electrochromic antiglare mirror according to one embodiment of the present invention.

The first aspect of the present invention is characterized by the use of a resin containing prescribed filler which can minimize a change in moisture content in an electrochromic film as a sealing resin.

In order to satisfy the durability and the reliability against environmental changes such as a high temperature and a high humidity, the resin containing prescribed filler required herein is a material having a density of resin coating not less than 1.5 g/cm$^3$. More preferably, the density of resin coating is not less than 1.7 g/cm$^3$. If the density of resin coating is not less than 1.7 g/cm$^3$, sufficient properties (near those of sealing glass), such as low moisture permeability (low steam permeability), a good ion shielding property, a good film strength, good abrasion resistance, and anti-injuring property can be obtained. If the density of resin coating is less than 1.5 g/cm$^3$, during the repeated cycle between the coloration and discoloration under high temperature and high humidity environments, the electrochromic film is deteriorated, is colored in an uneven manner, which would generate irregular color.

It is preferable for satisfying the durability and the reliability against environmental changes such as a high temperature and a high humidity to contain the filler in the resin containing the prescribed filler in a proportion of not more than 50% by weight. More preferably, considering the durability under the high temperature and high humidity environments, the content of the filler is not less than 70% by weight. If the content of the filler is less than 50% by weight, there is a tendency to bring about uneven coloring or corrosion.

In order to satisfy the durability and the reliability against environmental changes such as a high temperature and a high humidity, the diameter of the filler in the prescribed resin containing the filler is preferably not more than 100 μm. Particularly, considering anti-injuring of the electrochromic layer and the reflecting metal film, the diameter of the filler is more preferably not more than 50 μm. If the diameter of the filler is more than 100 μm, the electrochromic layer and the reflecting metal film may easily be injured during the course of the production of the electrochromic mirror, which causes decreasing of the quality or product failure. In such a case, the durability under the high temperature and high humidity environments can be obtained only with difficulty due to the injury.

In order to satisfy the durability and the reliability against environmental changes such as a high temperature and a high humidity, the thickness of the prescribed resin containing the filler should be from 1 μm to 1 mm. From the viewpoint of obtaining much more low moisture permeability (low steam permeability), and from the viewpoint of avoiding an adverse influence of the shrinkage stress during the curing the resin, the thickness of the resin containing the filler is preferably 50 to 150 μm. If the thickness of the resin containing the filler is less than 50 μm, there is a tendency to bring about uneven coloring or corrosion under the high temperature and high humidity environments.

In order to satisfy the durability and the reliability against environmental changes such as a high temperature and a high humidity on a practical level, the use of the resin containing the filler, which satisfies all the three requirements, i.e., the density, the content of the filler and the thickness, is required. The resin containing the filler, which satisfies all the three requirements, i.e., the density, the content of the filler and the thickness, has a extremely high effect for improving durability against environmental changes such as high temperature and high humidity environments. Also, in order to satisfy the durability and the reliability against environmental changes such as a high temperature and a high humidity on a practical level, the use of the resin containing the filler, which satisfies all the four requirements, i.e., the density, the content of the filler, the thickness and the diameter of the filler, is required.

From the viewpoint of the moisture resistance, humidity resistance, chemical resistance, oil resistance, heat resistance, etc., preferable base resins for the resin containing filler include epoxy resins, urethane resins, silicone resins, polysulfide resins, acrylic resins, fluorine resins, and the like. The filler is required to improve the physical properties and to impart the function, including decreasing the moisture permeability, (particularly decreasing of the moisture permeability at a high temperature and at a high humidity), increasing the density, improving the ion shielding property, and enhancing the strength of the coat, and an example of preferred filler includes silica.

The resin containing the filler can be formed into a resin film by a method such as flow coating, spray coating, printing or spin coating, with the application by the printing being preferred from the viewpoint of uniformity of the thickness of the resin.

The second aspect of the present invention is characterized by, for example as shown in FIG. 1, using a resin 8 containing prescribed filler which can minimize a change in moisture content in an electrochromic film as a sealing resin, and further by sealing the outer circumference by a silyl-containing polymer 9.

Here, by the use of the epoxy resin 8 containing the prescribed filler, which can minimize a change in moisture content in an electrochromic film, the moisture content in the electrochromic layer can be stabilized to a level near the use of the sealing glass relative to the environmental changes such as a high temperature and a high humidity. Consequently, there is an extremely high possibility to avoid the use of the sealing glass in comparison with the use of the conventional resin. However, in order to secure resistance to an elevated temperature and resistance to a high humidity on a practically satisfied level, the outer circumference 9 is required to be further sealed by a silyl-containing polymer 9. More specifically, the silyl-containing polymer 9 enhances durability to a high temperature as in the case of being left standing at an elevated temperature or under the operation at a high temperature. In the case where the outer circumference is not sealed by the silyl-containing polymer, uneven coloring is brought about on the outer circumference of the electrochromic film if being exposed under a high temperature environment over a prolonged period of time. This is probably due to a decrease in the moisture content in the electrochromic film. The silyl-containing polymer also improves the durability under a high temperature and a high humidity. In the case where the outer circumference is not sealed by the silyl-containing polymer, corrosion sometimes occurs from the outer circumference of the mirror.

Specifically, the silyl group ($-SiH_3$)-containing polymer in combination with the resin containing the prescribed filler can provide an effect for securing resistance to a high temperature and a high humidity on a practically satisfied level, for example, under the condition of being left standing at a high temperature (65° C.) or of being left standing at a high temperature and a high humidity (65° C. and 95% RH). In contrast, in the case where the outer circumference is not sealed by the silyl-containing polymer, no sufficient resistance to a high temperature and a high humidity can be obtained on a practically satisfied level under the condition of being left standing at a high temperature (65° C.) or of being left standing at a high temperature and a high humidity (65° C. and 95% RH). Also, if the outer circumference is sealed by an epoxy resin, a urethane resin, a silicone resin, a polysulfide resin, or any other resin instead of the silyl-containing polymer under the condition of being left standing at a high temperature (65° C.) or of being left standing at a high temperature and a high humidity (65° C. and 95% RH).

As described above, by the combination of the silyl-containing polymer with the resin containing the prescribed filler, an effect for securing resistance to a high temperature and a high humidity on a practically satisfied level can be obtained. This makes it possible to obtain durability and reliability against the environmental changes such as a high temperature and a high humidity on a practically sufficient level, and such an effect can be successfully realized without using a member corresponding to the sealing glass for the first time. Specifically, according to the present invention, an electrochromic antiglare mirror, which can provide durability and reliability against the environmental changes such as a high temperature and a high humidity, can be put into practice without using a member corresponding to the sealing glass for the first time.

Figure 4:
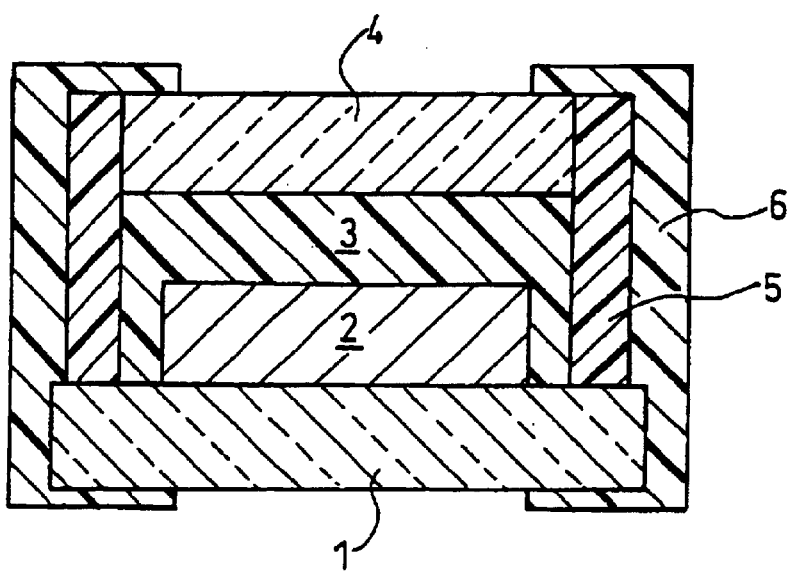
Figure 5:
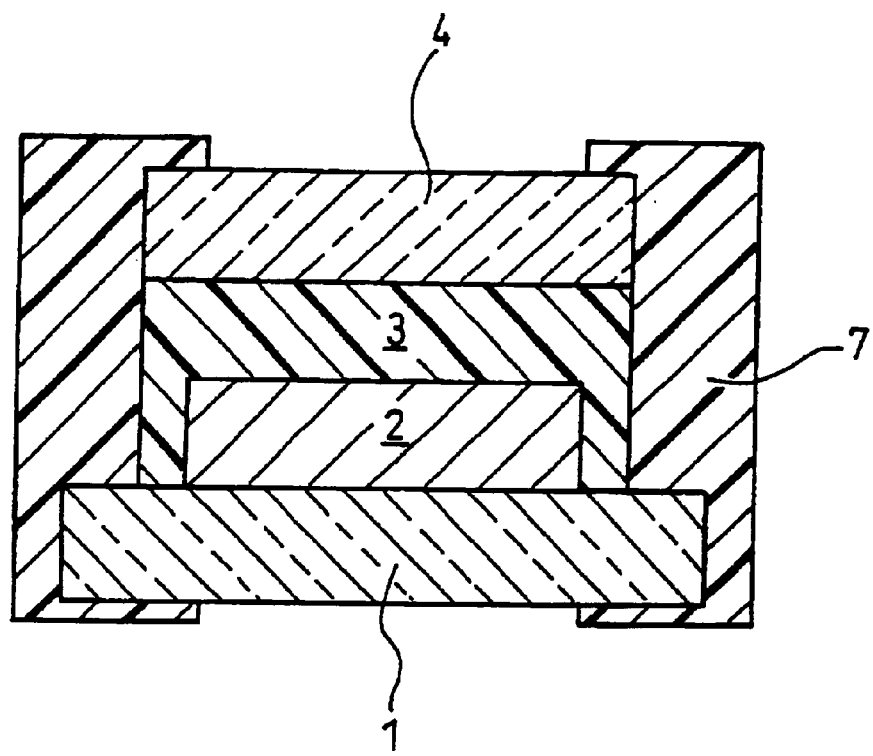

As a result, since no member corresponding to the sealing glass is used, the weight and the number of parts can be reduced. Also, since a step for adhering a member corresponding to the sealing glass is not required, the number of the steps can be reduced as well as no step for producing a sealing glass is required. As shown in FIG. 4, the side portion of the electrochromic mirror should not be doubly sealed by a fluorine type coating 5 and an anti-humidity material 6 such as a butyl tape and, thus, the steps are reduced.

Since the moisture permeability is in proportion to the thickness, the thickness of the silyl-containing polymer is required to be from 0.1 mm to 3.0 mm in order to obtain sufficient durability against a high temperature and a high humidity. More preferably, in order to obtain much more sufficient durability against a high temperature and a high humidity, the silyl-containing polymer has a thickness of from 1.0 mm to 30 mm.

From the viewpoint of the operability, the silyl-containing polymer is applied by a method of using a dispenser.

Figure 2:
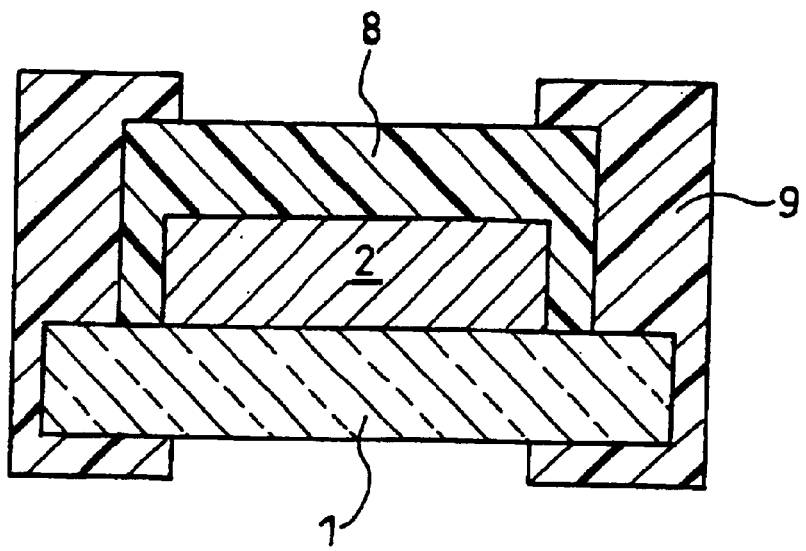
FIG. 2 is a cross sectional view schematically showing the configuration of the electrochromic antiglare mirror according to another embodiment of the present invention.
Figure 3:
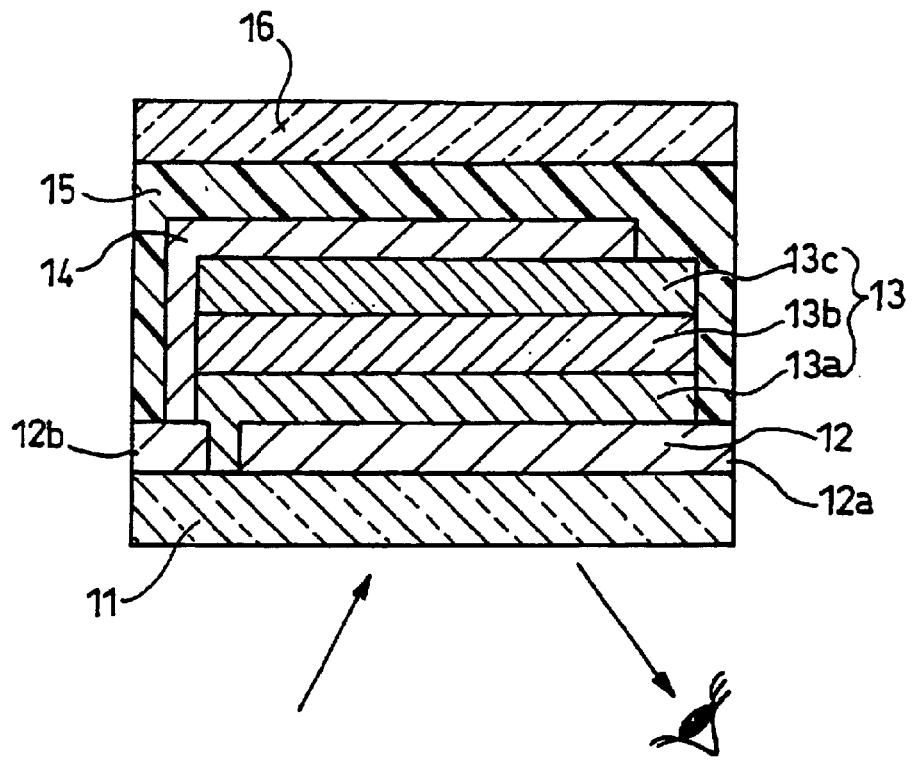
FIGS. 3 to 5 are cross sectional views each schematically showing the configuration of the conventional electrochromic antiglare mirror.

The silyl-containing polymer at least seals the outer circumference (side portion) of the mirror from the substrate glass to the film of the resin containing the prescribed filler. If a clip type electrode or such is fitted to the outer circumference (side portion) of the mirror for the connection to the transparent electrode film or a film serving as an electrode and reflecting film, the outer circumference (side portion) of the mirror including the clip type electrode is sealed. As shown in FIG. 2, when the silyl-containing polymer is applied to a part of the back surface of the resin 8 containing the prescribed filler and/or a part of the surface of the substrate glass 1 in addition to the outer circumference (side portion) of the mirror, the polymer also serves as a cushioning material. Particularly, sealing of a part of the back surface of the resin 8 containing the prescribed filler in addition to the seal of the outer circumference (side portion) of the mirror is proven to be preferable from the viewpoint of durability against a high temperature and durability against a high humidity.

In the present invention, the electrochromic layer may be a three-layered structure comprising an oxidative chromic film such as iridium oxides ($IrO_x$) and nickel oxides ($NiO_x$), solid electrode film such as tantalum pentoxide ($Ta_2O_5$) and magnesium fluoride ($MgF_2$), and a reductive chromic film such as tungsten trioxide ($WO_3$) and molybdenum trioxide ($MoO_3$). Specifically, the electrochromic layer may be a three-layered structure comprising $IrO_x$—$Ta_2O_5$—$WO_3$ so that the layer is colorless in a usual state and is changed to blue at the time of exhibiting its antiglare property.

Metal films such as Al, Ag, and Cr can be used as the film serving as an electrode and reflecting film.

As the transparent electrode film, a film made of ITO (indium/tin oxide), $SnO_2$, or such can be used.

These films can be formed by any of known thin film formation processes such as deposition, ion-plating, and plating processes.

The electrochromic antiglare mirror is not restricted to a flat type mirror, and may be a curved type mirror. The curved type electrochromic antiglare mirror has a configuration substantially similar to that of the flat type mirror shown in FIG. 1 or the like, except that all the parts including the substrate glasses 1 each having a transparent conductive film, the solid type electrochromic layer and the film 2 serving as an electrode and reflecting film, the resin 8 containing the prescribed filler, and the silyl-containing polymer 9 are formed in curved form at a prescribed curvature and, the electrochromic antiglare mirror is curved as a whole.

The electrochromic antiglare mirror according to the present invention may have a heater for removing cloudiness on the surface of the substrate glass. When a heater is provided on the mirror, a frequency to exposure to high temperature and high humidity environments becomes high, but the electrochromic antiglare mirror according to the present invention can obtain durability and reliability against the environmental changes such as a high temperature and a high humidity on a practically sufficient level even if the heater is provided.

Specifically, for example, a panel heater as a heating element may be adhered on almost whole area of the rear surface of the coat of the resin containing the filler by an adhesive etc. Concerning the panel heater, for example, if a PTC (positive character thermister) panel heater, it can directly driven by an automobile power source, and no temperature control circuit etc. is required. The PCT panel heater is composed of a macromolecular plane type heating element (a conductive resin having an electrode made of silver or copper etc provided thereon and being laminated by PET film) and the like. Water droplets spread over the surface of the mirror in a thin film state can be effectively removed by heating them through the panel heater.

EXAMPLE

On a glass substrate with an ITO film having a size for an automobile exterior mirror (180×110 mm), an electrochromic layer comprising a three-layered structure composed of $IrO_x$—$Ta_2O_5$—$WO_3$ and an Al film for serving as an electrode and a reflector were formed by deposition. Thereafter, an epoxy resin containing filler (available from Matsushita Electric Work Ltd. under trade name of CV5423F1) was applied so as to be 100 μu thick (which was then cured at 100° C. for 2 hours) to seal the mirror. Subsequently, a clip type electrode was fitted to the mirror, onto the outer circumference of the mirror was applied a silyl-containing polymer (sold by Three Bond Co., 1530) to seal the outer circumference of the mirror. This gave an electrochromic mirror.

As a result of 20,000 cycles between the coloration and discoloration of this electrochromic mirror at 65° C. and at 95% RH (switching the polarity at a constant voltage of 1.3 V each at an interval of 20 seconds), the change in the reflectance in a colored state, which was 8% before the test, and the change in the reflectance in a discolored state, which was 50%, were within 5%, respectively, indicating that the reflectance characteristics were not substantially deteriorated.

In contrast, in the case where the outer circumference was not sealed by the silyl-containing polymer, uneven color due to the deterioration of the electrochromic film was observed around the outer circumference during the course of coloration and discoloration after the test under the same conditions as described above. Also, in the case where an epoxy resin, a urethane resin, a silicone resin, a polysulfide resin and the like were used to seal the outer circumference of the mirror, uneven color due to the deterioration of the electrochromic film was observed around the outer circumference during the course of coloration and discoloration after the test under the same conditions as described above.

INDUSTRIAL APPLICABILITY

The electrochromic element according to the present invention is advantageously applicable to an electrochromic antiglare mirror constructed as an electrochromic mirror, particularly an automobile exterior mirror or interior mirror, which is required to have durability against a high temperature and durability against a high humidity.

What is claimed is:

1. A solid type electrochromic antiglare mirror comprising a transparent glass substrate having a transparent conductive film; a solid type electrochromic layer composed of an electrolyte film and a coloring film which colors due to an oxidation or reduction; and a film serving as an electrode and reflecting film formed on the back surface thereof on this order, said electrochromic layer and said film serving as an electrode and reflecting film being totally covered with, sealed by and protected by a resin containing a filler, whose density of the resin film is not less than 1.5 g/cm$^3$, from their back surface sides including their back and side surfaces.

2. The solid type electrochromic antiglare mirror as claimed in claim 1, wherein the filler content in said resin containing the filler is not less than 50% by weight.

3. The solid type electrochromic antiglare mirror as claimed in claim 1 or 2, wherein the diameter of the filer of said resin containing the filler is not more than 100 μm.

4. The solid type electrochromic antiglare mirror as claimed in any one of claims 1 to 3, wherein the thickness of the filer of said resin containing the filler is from 1 μm to 1 mm.

5. The solid type electrochromic antiglare mirror as claimed in claim 1, wherein a base resin for said resin containing filler is one resin selected from among epoxy resins, urethane resins, silicone resins, polysulfide resins, acrylic resins, and fluorine resins.

6. The solid type electrochromic antiglare mirror as claimed in claim 1, wherein said resin containing the filler is available from Matsushita Electric Work Ltd. under trade name of CV5423F1.

7. The solid type electrochromic antiglare mirror as claimed in claim 6, wherein said silyl-containing polymer is available from Three Bond Co., under the trade name of 1530.

8. The solid type electrochromic antiglare mirror as claimed in claim 1, wherein at least the outer circumference (side portion) of the mirror from the substrate glass to the film of the resin containing the filler is sealed by a silyl-containing polymer.

9. The solid type electrochromic antiglare mirror as claimed in claim 8, wherein a part of the back surface of the resin containing the filler and/or a part of the surface of the substrate glass is sealed by the silyl-containing polymer in addition to the outer circumference of the mirror, the polymer also serving as a cushioning material.

10. The solid type electrochromic antiglare mirror as claimed in claim 8, wherein the coat of said silyl-containing polymer has a thickness from 0.1 mm to 3.0 mm.

11. The solid type electrochromic antiglare mirror as claimed in claim 1, wherein said electrochromic layer is composed of a lamination of an oxidative chromic film, an electrolyte film and a reductive chromic film on this order.

12. The solid type electrochromic antiglare mirror as claimed in claim 11, wherein said electrochromic layer comprises a lamination of an Ir oxide film serving as the oxidative chromic film, a $Ta_2O_5$ film serving as electrolyte film and a $WO_3$ film serving as the reductive chromic film on this order.

13. The solid type electrochromic antiglare mirror as claimed in claim 1, which is constructed as an automobile exterior mirror or interior mirror.

* * * * *